United States Patent [19]

Sabins et al.

[11] Patent Number: 5,327,969
[45] Date of Patent: Jul. 12, 1994

[54] METHOD OF PREVENTING GAS MIGRATION DURING PRIMARY WELL CEMENTING

[75] Inventors: Fred L. Sabins; David L. Sutton, both of Duncan, Okla.

[73] Assignee: Halliburton Company, Duncan, Okla.

[21] Appl. No.: 55,167

[22] Filed: Apr. 30, 1993

[51] Int. Cl.⁵ .................. E21B 33/16; E21B 47/06; E21B 47/10
[52] U.S. Cl. ............................ 166/250; 166/253; 166/291; 166/292
[58] Field of Search ............ 166/250, 253, 285, 291, 166/292, 293

[56] References Cited

U.S. PATENT DOCUMENTS

| | | | |
|---|---|---|---|
| 2,742,090 | 4/1956 | Garrison | 166/292 X |
| 3,213,940 | 10/1965 | Wood | 166/291 X |
| 3,277,962 | 10/1966 | Flickinger et al. | 166/285 X |
| 3,572,438 | 3/1971 | Rohe | 166/285 |
| 4,235,291 | 11/1980 | Messenger | 166/292 |
| 4,304,298 | 12/1981 | Sutton | 166/293 |
| 4,524,828 | 6/1985 | Sabins et al. | 166/293 |
| 4,655,286 | 4/1987 | Wood | 166/285 |

OTHER PUBLICATIONS

Paper entitled "Transition Time of Cement Slurries Between the Fluid and Set State" by Fred L. Sabins, John M. Tinsley and David L. Sutton, presented at the 55th Annual Fall Technical Conference and Exhibition of the Society of Petroleum Engineers held in Dallas, Tex. Sep. 21-24, 1980.

Primary Examiner—George A. Suchfield
Attorney, Agent, or Firm—Robert A. Kent; Thomas R. Weaver; C. Clark Dougherty, Jr.

[57] ABSTRACT

The present invention provides a method of preventing gas migration during primary well cementing. The method basically comprises the steps of displacing a cement slurry into the annulus between a string of pipe to be cemented in a well bore and the walls of the well bore, determining the initial surface pressure in the pipe after the cement slurry is placed in the annulus, displacing additional cement slurry into the annulus as is necessary to make up for losses in the surface pressure due to cement slurry gel strength development and volume reduction whereby the surface pressure is maintained substantially equal to the initial surface pressure until the cement slurry develops a predetermined gel strength sufficient by itself to prevent gas migration, and then allowing the cement slurry to set into a hard impermeable mass in the annulus.

20 Claims, No Drawings

METHOD OF PREVENTING GAS MIGRATION DURING PRIMARY WELL CEMENTING

BACKGROUND OF THE INVENTION

1. Field of the Invention

The present invention relates generally to methods of preventing gas migration during primary well cementing, i.e., the cementing of a string of pipe in a well bore.

2. Description of the Prior Art

After a well bore is drilled by rotary drilling wherein a drilling fluid is circulated through the well bore, the circulation of the drilling fluid is stopped and a string of pipe, e.g., casing, is run in the well bore. After the pipe is run, the drilling fluid in the well bore is conditioned by circulating it downwardly through the interior of the pipe and upwardly through the annulus between the exterior of the pipe and the walls of the well bore while removing drilling solids and gas therefrom. The next operation performed on the well is usually primary cementing. That is, the string of pipe disposed in the well bore is cemented therein by placing a cement slurry in the annulus between the pipe and the walls of the well bore. The cement slurry is permitted to set into a hard substantially impermeable mass in the annulus whereby the pipe is bonded to the walls of the well bore and the annulus is sealed.

Gas migration, also called annular gas flow, is the migration of gas in the annulus from one or more gas formations penetrated by the well bore during and after primary cementing. Gas migration in the annulus can cause severe problems including communication between producing zones, e.g., high volume loss of gas from a high pressure zone to a low pressure zone, and the failure of the cement to seal the annulus which in the worst case can result in an uncontrollable blow-out.

It is known that gas migration is caused by the behavior of the cement slurry during the transition phase in which the cement slurry changes from a true hydraulic fluid to a highly viscous mass showing some solid characteristics. The transition phase starts when the cement slurry develops enough static gel strength to restrict the transmission of hydrostatic pressure over its column height and ends when the cement slurry develops a gel strength which is sufficient by itself to prevent migration of gas up through the cement slurry. If the pressure exerted on one or more gas formations by the cement slurry falls below the pressure of the gas in the formations, the gas enters the well bore and can migrate through the annulus. The initial gas migration causes flow channels to be formed in the cement slurry whereby the migration continues after the cement slurry sets.

Gas migration can be prevented during primary cementing if the pressure exerted by the cement slurry on gas formations penetrated by the well bore is maintained at a level greater than or equal to the pressure in the gas formations during the transition phase of the cement slurry.

Prior attempts to prevent gas migration have included the use or higher density drilling fluids and cement slurries, applying pressure to the annulus at the surface, utilizing more effective fluid loss control additives to prevent cement slurry volume reduction, the generation of a volume of high pressure gas within the cement slurry to increase its compressibility, entraining gas in the cement slurry at the surface as it is introduced into the well bore and the like. While all of the these techniques have proved to be beneficial, none have completely solved primary cementing gas migration problems. Thus, there continues to be a need for improved methods of preventing gas migration during primary well cementing.

SUMMARY OF THE INVENTION

The present invention provides an improved method of preventing gas migration during primary well cementing which meets the need described above and overcomes the shortcomings of the prior art. The method of the present invention for cementing a string of pipe in a well bore which penetrates a gas formation while preventing gas migration in the well bore basically comprises the following steps. A cement slurry is displaced downwardly through the pipe and upwardly into the annulus between the pipe and the walls of the well bore while maintaining sufficient hydrostatic pressure on the gas formation to prevent the entry of gas therefrom into the well bore. The initial surface pressure in the pipe after the cement slurry is placed in the annulus is determined, and additional cement slurry is displaced into the annulus during the transition phase of the cement slurry as is necessary to make up for losses in the pipe surface pressure brought about by cement slurry gel strength development and volume reduction, i.e., the pipe surface pressure is maintained substantially equal to the initial surface pressure in the pipe. The displacement of additional cement slurry into the annulus and the maintenance of the surface pressure substantially equal to the initial surface pressure prevents the pressure exerted on the gas formation from falling below the gas pressure which in turn prevents the entry of gas into the well bore until the cement slurry develops a predetermined gel strength sufficient by itself to prevent the migration of the gas. When such predetermined cement slurry gel strength is reached, the cement slurry is permitted to remain in a static state in the annulus so that it develops additional gel strength and sets into a hard impermeable mass therein.

Thus, it is a general object of the present invention to provide a method of preventing gas migration during primary well cementing.

Other and further objects, features and advantages of the present invention will be readily apparent to those skilled in the art upon a reading of the description of preferred embodiments which follows.

DESCRIPTION OF PREFERRED EMBODIMENTS

In primary well cementing, a cement sheath is formed in the annular space between a pipe, e.g., casing, disposed in a well bore and the walls of the well bore. The cement sheath is generally formed by displacing a pumpable hydraulic cement slurry downwardly through the pipe and upwardly into the annulus between the pipe and the well bore and permitting the cement slurry to remain in a static state in the annulus whereby it sets into a hard impermeable mass therein. The resulting cement sheath is intended to provide physical support and positioning to the pipe in the well bore and provide a bond between the pipe and the walls of the well bore whereby the annulus is sealed.

As mentioned above, primary cementing operations are often unsuccessful in preventing gas migration through the cemented annulus. Gas migration takes place in a well bore which penetrates one or more gas formations as a result of the pressure exerted in the well bore by the cement slurry falling below the formation gas pressure whereby gas enters and flows through the well bore before the cement slurry develops sufficient gel strength to prevent such gas entry and flow. Gas migration through the set cement slurry continues through flow channels remaining therein whereby gas is free to flow through the annulus to the surface and/or between zones or formations penetrated by the well bore. The interzonal flow of gas may not be evident until weeks or even months after completion of a well, and the hydrocarbon production ability of the well as a result thereof can be severely damaged.

Gas migration initially occurs after placement of a cement slurry in the annulus between the pipe and the walls of a well bore which penetrates a gas formation during the transition phase of the cement slurry from a true hydraulic fluid to a highly viscous mass. That is, the transition phase starts when the cement slurry develops enough static gel strength to restrict the transmission of full hydrostatic pressure over the height of the cement column in the annulus and ends when the cement slurry develops sufficient gel strength to prevent the flow of gas through the cement column.

The sequence of events during the transition phase of a cement slurry in a primary cementing operation is as follows. During the placement of the cement slurry in the annulus, the hydrostatic pressure exerted in the well bore and exerted on gas formations penetrated by the well bore is maintained sufficiently high to be greater than the gas formation pressure whereby the entry of gas into the well bore is prevented. After the slurry is placed in the annulus, water loss from the slurry to permeable formations or zones penetrated by the well bore begins, and when the cement slurry enters its transition phase and starts developing gel strength, the transmission of hydrostatic pressure over the length of the column begins to be restricted. As the loss in hydrostatic pressure transmission develops, the volume of the cement slurry also decreases due to fluid loss and the hydration reaction of cement and water in the slurry. The combination of hydrostatic pressure restriction due to the development of cement slurry gel strength and the volume loss of the cement slurry can cause the pressure exerted on the well bore by the cement column to fall below the pressure of gas formations penetrated by the well bore. If the cement slurry at the time the pressure exerted by the cement column falls below the gas formation pressure has not developed a gel strength sufficient by itself to prevent the percolation of the gas through the slurry, gas migration will occur.

By the present invention, a method is provided for preventing the pressure exerted by a cement slurry in the annulus during the cement slurry transition phase from dropping below the pressure required to prevent gas migration. The method basically comprises the following steps.

1. After a string of pipe has been set in the well bore, the well bore and the pipe are substantially filled with the drilling fluid used to drill the well bore. A cement slurry is displaced downwardly through the pipe and upwardly into the annulus between the pipe and the walls of the well bore while sufficient hydrostatic pressure is maintained on the well bore and one or more gas formations penetrated thereby to prevent the entry of gas into the well bore.

2. When the cement slurry has been placed in the annulus, the initial pressure exerted by the displacement fluid within the pipe at the surface is determined, and the surface pressure in the pipe is monitored thereafter while the cement slurry is in its transition phase.

3. As the cement slurry develops gel strength and loses volume during the transition phase, additional cement slurry is displaced into the annulus as is necessary to make up for losses in the pressure exerted in the pipe and to maintain the surface pressure substantially equal to the initial surface pressure. The displacement of additional cement slurry into the annulus prevents the pressure exerted in the annulus by the cement column from falling and prevents the entry of formation gas into the well bore, and such displacement is continued until the cement slurry in the annulus develops a predetermined gel strength sufficient by itself to prevent the migration of gas through the slurry.

4. The cement slurry is then permitted to remain static in the annulus so that it develops additional gel strength and sets into a hard impermeable mass therein without the occurrence of gas migration.

The cement slurry utilized in performing primary cementing in a well bore can be comprised of a variety of cementitious materials and additives. For example, the cementitious material utilized in the slurry can be any of various hydraulic cementitious materials which form hard cementitious masses in the presence of water. Examples of such materials are Portland cement, high alumina cement, slag, fly ash of the ASTM Class F type and lime, fly ash which includes free lime of the ASTM Class C type, condensed silica fume with lime, gypsum cement (calcium sulfate hemihydrate) and mixtures of such cementitious materials. Preferred cementitious materials are those of the above types which are of a fine particle size whereby the particles have diameters no greater than about 30 microns and have a specific surface area no less than about 1.5 square meters per cubic centimeter. Of the various cementitious materials mentioned above, the most preferred are fine particle size Portland cement, slag, fly ash and condensed silica fume with lime. The most preferred cementitious material for use in accordance with this invention is fine particle size Portland cement. The cement slurries formed with one or more of the above mentioned cementitious materials can include portions of the drilling fluid used to drill the well bore as components thereof. In addition, the cement slurries can include a variety of known well cement additives such as dispersing agents, fluid loss additives, set delaying additives and the like.

As mentioned, after a well bore is drilled during which the drilling fluid used is circulated it through the well bore, the circulation of the drilling fluid is stopped, the well is usually logged and a string of pipe, e.g., casing, is run in the well bore. After the pipe is set, the drilling fluid in the well bore is conditioned by circulating drilling fluid downwardly through the interior of the pipe and upwardly through the annulus between the exterior of the pipe and the walls of the well bore while removing drilling solids and gas therefrom. After conditioning, both the pipe and annulus are substantially filled with drilling fluid.

The next operation performed on the well is generally primary cementing, i.e., the string of pipe disposed in the well bore is cemented therein by placing a cement slurry in the annulus between the pipe and the walls of the well bore. In accordance with the present invention, a cement slurry is pumped into the pipe and then displaced into the annulus by pumping drilling fluid into the pipe. As the cement slurry is placed in the annulus, drilling fluid therein is displaced upwardly and out of the well bore into a drilling fluid accumulating pit or tank. Thus, after placement of the cement slurry in the annulus, the annulus is filled with the cement slurry and drilling fluid extending from the top of the cement slurry to the surface. The pipe is filled with drilling fluid with the exception of a small amount of cement slurry left in the bottom of the pipe as will be described further hereinbelow. When the pipe is shut-in after placement of the cement slurry, a pressure is exerted within the pipe at the surface which is equivalent to the difference in weight between the column of cement slurry in the annulus and the corresponding column of drilling fluid in the pipe.

In order to keep the cement slurry and drilling fluid separated during the placement of the cement slurry and to prevent the back flow of cement slurry from the annulus into the pipe, a float shoe is connected to the bottom of the pipe and fluid separating plugs are placed in the pipe above and below the cement slurry. As the cement slurry is pumped into and displaced through the pipe, the bottom plug moves downwardly in the pipe until its movement is stopped as a result of its contact with the float shoe at the bottom of the pipe. The bottom plug includes a flow passageway therein closed by a pressure rupturable disk or other means whereby when the bottom plug lands on the float shoe, the passageway is opened and the cement slurry flows through the float shoe into the annulus. The float shoe includes a check valve therein to prevent back flow of the cement slurry, and the usual procedure is to continue displacement of the cement slurry until the movement of the top plug is stopped as a result of its landing on the bottom plug adjacent to the float shoe. In the conventional practice, once the top plug has landed, the cement slurry is prevented from backflowing by the check valve in the float shoe and the top plug prevents additional flow through the float shoe into the annulus. As a result, losses in the pressure differential between the cement slurry in the annulus and the drilling fluid in the pipe are not communicated to the surface by way of the pipe and additional cement slurry cannot be pumped into the annulus.

In accordance with the present invention, when fluid separating plugs are utilized, the top plug is not landed on the bottom plug, but instead the displacement of the cement slurry is stopped at a point whereby the top plug is a distance away from the bottom plug and a small quantity of cement slurry, e.g., from about 5 to 10 barrels, is left in the bottom of the pipe and in the float shoe. When the displacement of the cement slurry is stopped, the pipe is shut in and since the top plug is not landed on the bottom plug, losses in the pressure differential between the annulus and the pipe are transmitted to the surface and can be indicated by a pressure gauge or other pressure indicating device.

Immediately after placement of the cement slurry in the annulus as described above, the initial surface pressure in the pipe is determined. Thereafter, the surface pressure in the pipe is monitored and as the cement slurry in the annulus progresses through its transition phase whereby it develops gel strength and diminishes in volume due to fluid loss and hydration, the surface pipe pressure is reduced. Stated another way, as the column of cement slurry in the annulus diminishes in volume and loses its ability to transmit hydrostatic pressure, the differential pressure between the columns of cement slurry in the annulus and drilling fluid in the pipe continuously diminishes.

In order to prevent the pressure exerted by the cement slurry in the annulus on gas formations penetrated by the well bore from falling below the formation gas pressure and gas migration from occurring as described above, each time the surface pressure in the pipe falls by a significant increment during the cement slurry transition phase, additional cement slurry is displaced into the annulus to make up for the pressure loss. In other words, the pressure losses in the pipe at the surface are monitored during the transition phase and additional cement slurry is displaced into the annulus in increments to make up for pressure losses and maintain the pipe surface pressure substantially equal to the initial surface pressure. This displacement of additional cement slurry into the annulus to make up for the losses in surface pressure in the pipe is continued until the cement slurry in the annulus develops a predetermined gel strength sufficient by itself to prevent gas migration. Thereafter, the cement slurry is permitted to remain static in the annulus so that it develops additional gel strength and sets into a hard impermeable mass therein without the occurrence of gas migration.

The particular cement slurry gel strength sufficient by itself to prevent gas migration through the slurry depends on a variety of factors including the particular cement composition utilized, the pressure of the gas contained in gas formations penetrated by the well bore, well geometry, cement column length, etc. However, the required cement slurry gel strength can be approximated using the following equation:

$$SGS = 20.8\ R(\Delta \rho)$$

where:
SGS = static gel strength (lbs/100 ft$^2$);
R = gas bubble radius (inches);
$\Delta \rho$ = difference in density between the cement slurry and gas (lbs/gal);
20.8 = conversion factor.

This equation assumes a spherical bubble of gas in the cement that can grow to an unlimited size.

The predetermined gel strength required to prevent the percolation and migration of gas through the cement slurry can be determined using the above relationship when the various variables in the relationship are known under ideal conditions. Also, the particular cement slurry to be used can be tested in the laboratory to determine the cement slurry gel strength which will resist the percolation of gas at a particular gas pressure. A test apparatus can be used of the type described in the Society of Petroleum Engineers of AIME, Paper No. SPE 9285, Transition Time of Cement Slurries Between the Fluid and Set State, Sabins, Tinsley and Sutton, presented at Dallas, Tex., on Sep. 21-24, 1980. Generally, the predetermined cement slurry gel strength required to prevent the migration of pressurized gas in most wells is in the range of from about 250 to about 400 pounds per 100 square feet. A safe value is about 500 pounds per 100 square feet. A preferred value which usually includes a safety factor of 2 or greater is 1000 lb/100 ft$^2$.

As described above, in accordance with the method of this invention additional cement slurry is displaced into the annulus during the transition phase of the cement slurry to prevent losses in the pressure exerted by the cement slurry until a predetermined cement slurry gel strength sufficient by itself to prevent the entry of gas is developed by the cement slurry. The attainment of that particular cement slurry gel strength is determined from the total losses in the pipe surface pressure which are made up by displacing additional cement slurry into the annulus in accordance with the following relationship:

$$\text{Total Made-up Losses (psi)} = \frac{\text{Predetermined Gel Strength (lb./100 ft.}^2\text{)}}{300} \times \frac{\text{height of cement in annulus (ft.)}}{\text{effective diameter of annulus (in.)}}$$

Thus, when the total losses in the pipe surface pressure which have been made up are equivalent to the predetermined gel strength as determined by the above relationship, the maintenance of the surface pipe pressure is terminated and the cement slurry in the annulus is permitted to remain static whereby it develops additional gel strength and ultimately sets into a hard impermeable mass.

In order to further illustrate the method of this invention, the following example is given.

EXAMPLE

A cement slurry comprised of Portland cement, water and additives having a density of 16 pounds per gallon is displaced into the annulus between a 5½ inch diameter casing and the walls of a well bore having a diameter of about 8½ inches. The well bore and pipe are 10,000 feet in length, the height of the cement column in the annulus from the bottom of the well bore is 6,000 feet and 4,000 feet of a drilling fluid having a density of 12 pounds per gallon extend from the top of the cement column to the surface.

The pipe includes a conventional float shoe, and top and bottom fluid separating plugs are utilized to separate the cement slurry from the drilling fluid. During the displacement of the cement slurry, the top plug is stopped before it is landed on the bottom plug leaving from about 5 to 10 barrels of cement slurry in the float shoe and in the bottom of the pipe. The total height of drilling fluid in the pipe extending from above the top plug to the surface is approximately 10,000 feet.

Immediately after the cement slurry is placed in the annulus, the pipe is shut in and the surface pressure within the pipe is recorded at a level of 1,246 pounds per square inch. This pipe surface pressure is equivalent to the difference in the weights of the column of cement slurry in the annulus and the corresponding column of drilling fluid in the pipe. The pressure can be calculated as follows:

$$\Delta p \text{ (Pipe Surface Pressure)} = \left[ \text{Cement Slurry Density (lb/gal)} - \text{Drilling Fluid Density (lb/gal)} \right] \times \text{Cement Column Height} \times 0.0519$$
$$= [16 - 12] \times 6000 \times 0.0519$$
$$= 1,246 \text{ psi}$$

A gas formation at the interval between 9,000 feet and 9,050 feet is penetrated by the well bore. The pressurized gas within the gas formation exerts a pore pressure on the cement slurry of 11.5 pounds per gallon. The over balance pressure on the gas exerted by the cement slurry before the cement slurry enters its transition phase is 1505 psi. The over balance pressure can be calculated as follows:

$$\Delta p \text{ (over balance)} = \left[ \left( \begin{array}{c} \text{Cement} \\ \text{Slurry} \\ \text{Density} \\ \text{(lb/gal)} \end{array} - \begin{array}{c} \text{Gas Pressure} \\ \text{on Cement} \\ \text{Slurry} \\ \text{(lb/gal)} \end{array} \right) \times (6000) + \left( \begin{array}{c} \text{Drilling} \\ \text{Fluid} \\ \text{Density} \\ \text{(lb/gal)} \end{array} - \begin{array}{c} \text{Gas Pressure} \\ \text{on Drilling} \\ \text{Fluid} \\ \text{(lb/gal)} \end{array} \right) \times (4000) \right] \times 0.0519$$
$$= [(16 - 11.5) \times (6000) + (12 - 11.5) \times (4000)] \times 0.0519$$
$$= 1505 \text{ psi}$$

As the cement slurry in the annulus goes through its transition phase, the pressure in the annulus decreases which is reflected by a lowering of the pressure in the pipe at the surface. Each time the pipe surface pressure is reduced by a significant increment, additional cement slurry is displaced into the annulus to repressure the annulus and maintain the pipe surface pressure substantially equal to the pipe surface pressure which was initially recorded.

After 30 minutes the cement slurry in the annulus has developed a gel strength of 100 pounds per 100 square feet. That gel strength development causes a pipe surface pressure loss of 667 psi. The loss can be calculated as follows:

$$\Delta p \text{ (Pipe Surface Pressure Loss)} = \frac{\text{Cement Slurry Gel Strength (lb/100 ft}^2\text{)}}{300} \times \frac{\text{Cement Slurry Height (ft.)}}{\text{Effective Diameter of Annulus (in.)}}$$
$$= \frac{100}{300} \times \frac{6000}{3}$$
$$= 667 \text{ psi}$$

As stated above, the annulus is repressurized by displacing additional cement slurry thereinto to bring the pipe surface pressure level back to 1,246 pounds per square inch. Typically, only a small amount of cement slurry is required to be displaced in order to repressure the annulus. The incremental repressuring of the annulus by displacing additional cement slurry thereinto is continued until the cement slurry reaches the predetermined static gel strength required to prevent the entry of gas into the annulus, i.e., a gel strength of about 1,000 pounds per 100 square feet. The gel strength of 1000 lb/100 ft² includes a safety factor of 2 from the above mentioned safe value of 500 lbs/100 ft². The total losses in pipe surface pressure which must be made up in order for the cement slurry to have a gel strength of a 1,000 pounds per 100 square feet is determined as follows:

$$\text{Total Made-up Losses (psi)} = \frac{\text{Predetermined Gel Strength (lb./100 ft.}^2\text{)}}{300} \times \frac{\text{height of cement in annulus (ft.)}}{\text{effective diameter of annulus (in.)}}$$

$$\text{Total Made-up Losses (psi)} = \frac{1,000}{300} \times \frac{6,000}{3.0} = 6,667 \text{ psi.}$$

Thus, when a total pipe surface pressure loss of 6,667 pounds per square inch has been made up by incrementally displacing additional cement slurry into the annulus, the cement slurry in the annulus will have achieved the predetermined required gel strength of 1,000 pounds per 100 square feet. At that point, the displacement of additional cement slurry into the annulus is discontinued and the cement slurry is permitted to remain static in the annulus so that it develops additional gel strength and sets into a hard impermeable mass therein without gas migration having occurred.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of cementing a string of pipe in a well bore which penetrates a gas formation while preventing gas migration in the well bore, both the pipe and well bore being substantially filled with drilling fluid, comprising the steps of:
    (a) displacing a cement slurry downwardly through said pipe and upwardly into the annulus between said pipe and the walls of said well bore while maintaining sufficient hydrostatic pressure on said gas formation to prevent the entry of gas therefrom into said well bore;
    (b) determining the initial surface pressure in said pipe after said cement slurry is displaced into said annulus in accordance with step (a);
    (c) displacing additional cement slurry into said annulus as is necessary to make up for losses in said surface pressure due to cement slurry gel strength development and volume reduction and to maintain said surface pressure substantially equal to said initial surface pressure determined in accordance with step (b) thereby preventing the entry of gas from said gas formation into said well bore until said cement slurry in said annulus develops a predetermined gel strength sufficient by itself to prevent the migration of said gas; and then
    (d) allowing said cement slurry to set into a hard impermeable mass in said annulus.

2. The method of claim 1 wherein said predetermined gel strength sufficient by itself to prevent the entry of said gas is determined in accordance with the following relationship:

$$SGS = 20.8\ R(\Delta\rho)$$

where:
    SGS = static gel strength (lbs/100 ft$^2$);
    R = gas bubble radius (inches); and
    $\Delta\rho$ = difference in density between said cement slurry and said gas.

3. The method of claim 2 wherein said surface pressure in said pipe is maintained substantially equal to said initial surface pressure in accordance with step (c) until the total of said losses in said surface pressure which have been made up are equivalent to said predetermined gel strength based on the following relationship:

$$\text{Total Made-up Losses (psi)} = \frac{\text{Predetermined Gel Strength (lb./100 ft.}^2\text{)}}{300} \times \frac{\text{height of cement in annulus (ft.)}}{\text{effective diameter of annulus (in.)}}$$

4. The method of claim 1 wherein said predetermined cement slurry gel strength sufficient by itself to prevent the migration of said gas is in the range of from about 250 to about 1000 pounds per 100 square feet.

5. The method of claim 1 wherein said cement slurry is displaced into said annulus in accordance with step (a) by pumping said cement slurry into said pipe and then displacing said cement slurry into said annulus by pumping drilling fluid used to drill said well bore into said pipe.

6. The method of claim 1 wherein said additional cement slurry is displaced into said annulus in accordance with step (c) by pumping additional drilling fluid into said pipe.

7. The method of claim 1 wherein said pipe includes a float shoe at the bottom end thereof and said displaced cement slurry is separated from said drilling fluid in said pipe by top and bottom fluid separating plugs.

8. The method of claim 7 wherein said displacement of said cement slurry into said annulus is stopped prior to when said top fluid separating plug reaches said bottom fluid separating plug adjacent said float shoe.

9. A method of cementing a string of pipe in a well bore which penetrates a gas formation while preventing gas migration in the well bore, both the pipe and well bore being substantially filled with drilling fluid, comprising the steps of:
    (a) displacing a cement slurry downwardly through said pipe and upwardly into the annulus between said pipe and the walls of said well bore while maintaining sufficient hydrostatic pressure on said gas formation to prevent the entry of pressurized gas therefrom into said well bore;
    (b) determining the initial surface pressure in said pipe after said cement slurry is displaced into said annulus in accordance with step (a);
    (c) displacing additional cement slurry into said annulus as is necessary to make up for losses in said surface pressure due to cement slurry gel strength development and volume reduction and to maintain said surface pressure substantially equal to said initial surface pressure determined in accordance with step (b) thereby preventing the entry of gas from said gas formation into said well bore until said cement slurry in said annulus develops a predetermined gel strength sufficient by itself to prevent the migration of said gas, said predetermined gel strength being determined in accordance with the following relationship:

$$SGS = 20.8\ R(\Delta\rho)$$

where:
    SGS = static gel strength ( lbs/100 ft$^2$);
    R = gas bubble radius (inches); and
    $\Delta\rho$ = difference in density between said cement slurry and said gas; and then
    (d) permitting said cement slurry to remain static in said annulus so that it develops additional gel strength and sets into a hard impermeable mass therein.

10. The method of claim 9 wherein said surface pressure in said pipe is maintained substantially equal to said initial surface pressure in accordance with step (c) until the total of said losses in said surface pressure which have been made up are equivalent to said predetermined gel strength based on the following relationship:

$$\text{Total Made-up Losses (psi)} = \frac{\text{Predetermined Gel Strength (lb./100 ft.}^2\text{)}}{300} \times \frac{\text{height of cement in annulus (ft.)}}{\text{effective diameter of annulus (in.)}}$$

11. The method of claim 9 wherein said cement slurry is comprised of water and a cementitious material selected from the group consisting of Portland cement, high alumina cement, slag, fly ash and lime, condensed silica fume and lime, gypsum cement and mixtures of said cementitious materials.

12. The method of claim 9 wherein said cement slurry is displaced into said annulus in accordance with step (a) by pumping said cement slurry into said pipe and then displacing said cement slurry into said annulus by pumping drilling fluid used to drill said well bore into said pipe.

13. The method of claim 9 wherein said additional cement slurry is displaced into said annulus in accordance with step (c) by pumping additional drilling fluid into said pipe.

14. The method of claim 9 wherein said pipe includes a float shoe at the bottom end thereof and said displaced cement slurry is separated from said drilling fluid in said pipe by top and bottom fluid separating plugs.

15. The method of claim 14 wherein said displacement of said cement slurry into said annulus is stopped prior to when said top fluid separating plug reaches said bottom fluid separating plug adjacent said float shoe.

16. A method of cementing a string of pipe having a float shoe at the bottom end thereof in a well bore which penetrates a gas formation while preventing gas migration in the well bore, both the pipe and well bore being substantially filled with drilling fluid, comprising the steps of:

(a) pumping a fluid separating plug followed by a cement slurry into said pipe;

(b) displacing said cement slurry with a second fluid separating plug and drilling fluid downwardly through said pipe, said first fluid separating plug including a passageway therethrough which opens when said plug lands on said float shoe thereby allowing said cement slurry to flow into said annulus;

(c) continuing the displacement of said cement slurry upwardly into the annulus between said pipe and the walls of said well bore while maintaining sufficient hydrostatic pressure on said gas formation to prevent the entry of gas therefrom into said well bore;

(d) stopping said displacement before said second fluid separating plug reaches said bottom fluid separating plug adjacent said float shoe;

(e) determining the initial surface pressure in said pipe after said cement slurry is displaced into said annulus in accordance with step (c);

(f) displacing additional cement slurry into said annulus as is necessary to make up for losses in said surface pressure due to cement slurry gel strength development and volume reduction and to maintain said surface pressure substantially equal to said initial surface pressure determined in accordance with step (e) thereby preventing the entry of gas from said gas formation into said well bore until said cement slurry in said annulus develops a predetermined gel strength sufficient by itself to prevent the migration of said gas, said predetermined gel strength being determined in accordance with the following relationship:

$$SGS = 20.8 \, R(\Delta \rho)$$

where:
SGS = static gel strength (lbs/100 ft$^2$);
R = gas bubble radius (inches); and
$\Delta \rho$ = difference in density between said cement slurry and said gas; and then (g) permitting said cement slurry to remain static in said annulus so that it develops additional gel strength and sets into a hard impermeable mass therein.

17. The method of claim 16 wherein said surface pressure in said pipe is maintained substantially equal to said initial surface pressure in accordance with step (f) until the total of said losses in said surface pressure which have been made up are equivalent to said predetermined gel strength based on the following relationship:

$$\text{Total Made-up Losses (psi)} = \frac{\text{Predetermined Gel Strength (lb./100 ft.}^2\text{)}}{300} \times \frac{\text{height of cement in annulus (ft.)}}{\text{effective diameter of annulus (in.)}}$$

18. The method of claim 16 wherein said cement slurry is comprised of water and a cementitious material selected from the group consisting of Portland cement, high alumina cement, slag, fly ash and lime, condensed silica fume and lime, gypsum cement and mixtures of said cementitious materials.

19. The method of claim 16 wherein said predetermined cement slurry gel strength is in the range of from about 250 to about 1000 pounds per 100 square feet.

20. The method of claim 16 wherein said cementitious material is comprised of water and Portland cement.

* * * * *